(12) United States Patent
Doerry et al.

(10) Patent No.: US 7,436,349 B1
(45) Date of Patent: Oct. 14, 2008

(54) CONTROLLING DATA COLLECTION TO SUPPORT SAR IMAGE ROTATION

(75) Inventors: Armin W. Doerry, Albuquerque, NM (US); J. Thomas Cordaro, Albuquerque, NM (US); Bryan L. Burns, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 177 days.

(21) Appl. No.: 11/474,768

(22) Filed: Jun. 26, 2006

(51) Int. Cl.
*G01S 13/90* (2006.01)
(52) U.S. Cl. .................................. 342/25 A; 342/25 F
(58) Field of Classification Search ............... 342/25 R, 342/191, 162
See application file for complete search history.

(56) References Cited

U.S. PATENT DOCUMENTS

| 5,250,952 | A | | 10/1993 | Roth | |
|---|---|---|---|---|---|
| 5,442,364 | A | * | 8/1995 | Lee et al. | 342/372 |
| 6,255,981 | B1 | | 7/2001 | Samaniego | |
| 6,765,526 | B1 | * | 7/2004 | Doerry | 342/160 |
| 2005/0179579 | A1 | * | 8/2005 | Pinder et al. | 342/25 R |

OTHER PUBLICATIONS

Armin Doerry, "Bandwidth requirements for fine resolution squinted SAR", SPIE 2000 International Symposium on Aerospace/Defense Sensing, Simulation, and Controls, Radar Sensor Technology V, vol. 4033, Orlando FL, Apr. 27, 2000.

B. L. Burns, J. T. Cordaro, "SAR image formation algorithm that compensates for the spatially variant effects of antenna motion", SPIE Proceedings, vol. 2230, SPIE's International Symposium on Optical Engineering in Aerospace Sensing, Orlando, Apr. 4-8, 1994.
T. Payne, "Pre-formation SAR to SAR image registration", IGARSS 2001, Scanning the Present and Resolving the Future, Proceedings of the IEEE 2001 International Geoscience and Remote Sensing Symposium, vol. 7, p. 3033-3035, Sydney, NSW, Australia, Jul. 9-13, 2001.
N. Cadalli, D.C. Munson, Jr., "A simulation study of the omega -k SAR algorithm for the highly squinted case with application to runway imaging", Proceedings of 2000 International Conference on Acoustics, Speech and Signal Processing, vol. 5, p. 3025-3028 Istanbul, Turkey, Jun. 5-9, 2000.
D. S. Rosario, "Estimating Squinted SAR Data: An Efficient Multivariate Minimization Approach Using Only Essential 3-D Target Information", Proceedings. International Conference on Image Processing, vol. 3, p. 718-721, Santa Barbara, CA, USA, Oct. 26-29, 1997.
Sun Jin-ping; Mao Shi-yi; Liu Zhong-kan; Hong Wen, "Using frequency scaling approach to process squint mode spotlight SAR data", Proceedings of the SPIE—The International Society for Optical Engineering, Algorithms for Synthetic Aperture Radar Imagery VIII, vol. 4382, p. 22-28, Orlando, FL, USA, Apr. 16-19, 2001.

* cited by examiner

*Primary Examiner*—Thomas H Tarcza
*Assistant Examiner*—Cassi Galt
(74) *Attorney, Agent, or Firm*—Scott B. Stahl; William R. Conley

(57) ABSTRACT

A desired rotation of a synthetic aperture radar (SAR) image can be facilitated by adjusting a SAR data collection operation based on the desired rotation. The SAR data collected by the adjusted SAR data collection operation can be efficiently exploited to form therefrom a SAR image having the desired rotational orientation.

19 Claims, 7 Drawing Sheets

CONTROLLING DATA COLLECTION TO SUPPORT SAR IMAGE ROTATION

This invention was developed under Contract DE-AC04-94AL85000 between Sandia Corporation and the U.S. Department of Energy. The U.S. Government has certain rights in this invention.

FIELD OF THE INVENTION

The invention relates generally to synthetic aperture radar (SAR) and, more particularly, to rotation of SAR images.

BACKGROUND OF THE INVENTION

The earliest Synthetic Aperture Radar (SAR) systems collected data with the radar's antenna aimed broadside to the aircraft's flight path. Images formed from this data were displayed in a natural coordinate system with axes oriented in directions parallel to the flight path, and orthogonal to the flight path. These directions were typically respectively called "along-track" and "cross-track", which emphasized their alignment with the aircraft's flight track.

Later, more sophisticated SAR systems collected data with the radar's antenna pointed in directions other than broadside to the aircraft. This geometry was termed "squint" operation. The image formation process then yielded a more natural image coordinate frame where principal axes were aligned with the bearing from aircraft to target scene, and orthogonal to this on the ground. These directions were often referred to as "range" and "cross-range", which emphasized their alignment with target bearing.

To be sure, once an image is formed, it can be rotated to any other orientation using well-known image processing techniques. However, for arbitrary-angle rotations these algorithms are computationally expensive, involving multi-dimensional interpolation and resampling of the data. These operations also often cause the data to lose fidelity, and are particularly problematic for the complex images normally associated with SAR. Complex pixel information refers to each image element (pixel) having both a magnitude and phase component, or equivalent. Complex images are necessary for many subsequent image exploitation techniques such as Interferometric SAR (InSAR, IFSAR) and Coherent Change Detection (CCD).

It is therefore desirable to alleviate the aforementioned difficulties associated with conventional approaches to SAR image rotation. According to exemplary embodiments of the present invention, this can be addressed by adjusting the SAR data collection operation based on the desired rotation. The SAR data collected by the adjusted SAR data collection operation can then be efficiently exploited to form therefrom a SAR image having the desired rotational orientation.

DETAILED DESCRIPTION

Figure 1:
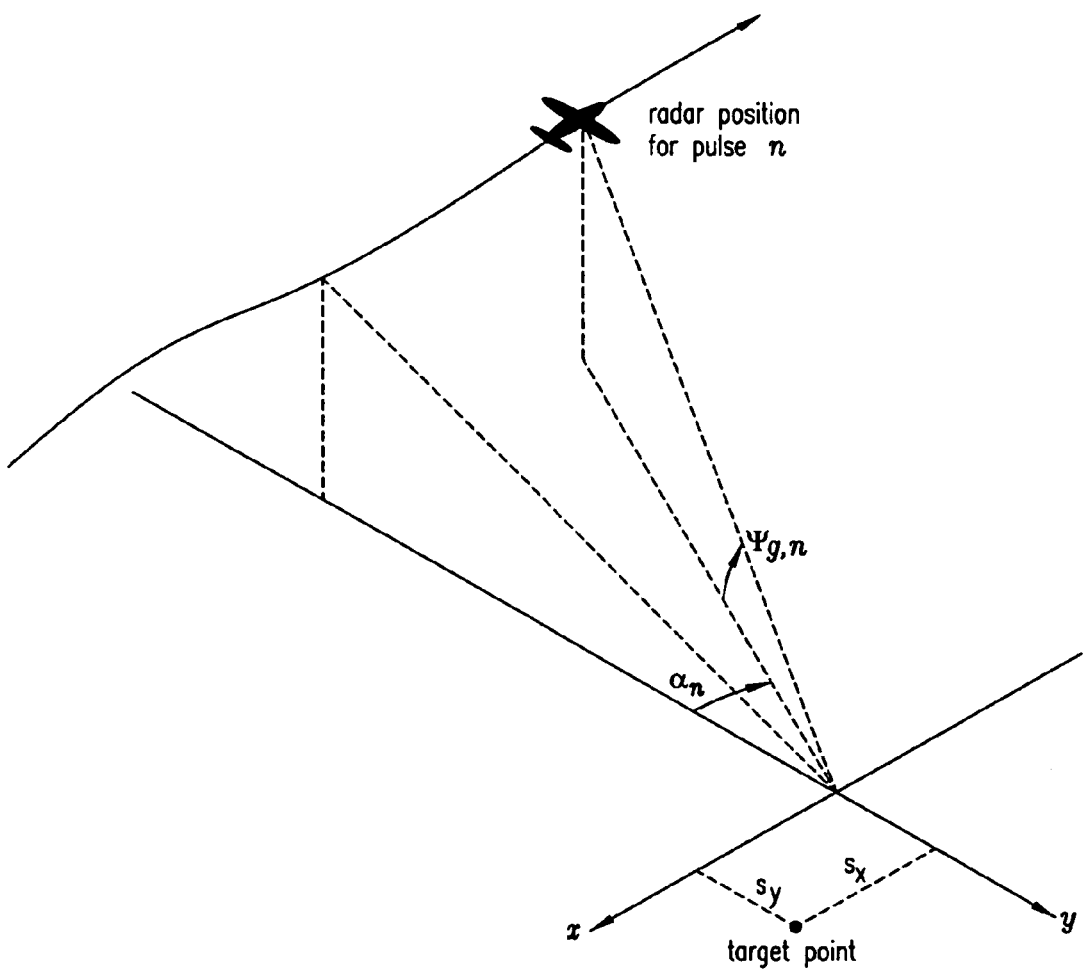
FIG. 1 illustrates conventional SAR data collection geometry.

According to exemplary embodiments of the invention, the SAR data collection process is adjusted to provide the SAR phase history data on a rotated grid in the Fourier space of the scene being imaged. The Fourier space of the scene being imaged refers to the Fourier transform of the 3-D complex reflectivity of that scene. Subsequent image formation preserves the rotated geometry to allow SAR images to be formed at arbitrary rotation angles without the use of computationally expensive interpolation or resampling operations. This can be useful where control of image orientation is desired, for example, for generating squinted stripmaps and applications requiring registered images, among others.

Reviewing briefly some general SAR concepts, for images employing axes in range and cross-range directions, the image y-axis can be defined to be in a direction away from the radar's synthetic aperture center and through the image scene center (as projected on the ground). The x-axis is then perpendicular to the y-axis, and on the ground. With these definitions, the squint angle is defined as the difference between the bearing to the target scene, and the ground track of the aircraft. Thus, when the target is broadside relative to the aircraft, the squint angle is 90 degrees. In any case, the natural image orientation depends only on the locations of the aperture center and scene center.

However, occasions exist where it would be useful to rotate the image to a new orientation, where the physical directions of the x and y axes do not depend on the location of the aperture center. While rotations of multiples of 90 degrees are trivial, arbitrary rotations are considerably more difficult. Examples of applications for such a capability include forming a squinted stripmap in a "push-broom" fashion, maintaining constant scene orientation for easy image registration, and creating conventional "North-up" maps.

The present invention leverages from several ideas to provide the capability of forming an arbitrarily oriented SAR image without using overt image interpolations. These are:

the recognition that a translation in Fourier space is equivalent to a linear phase change in the image;

the recognition that any area in the Fourier space of the scene will render an image of the scene;

the recognition that a rotated image scene will have a similarly rotated Fourier space representation, so that rotating the Fourier space of a scene will allow formation of rotated images; and the ability to place phase history data samples in Fourier space with great precision by suitably controlling the SAR data collection operation.

According to exemplary embodiments of the invention, the SAR data can be collected in a manner that causes the corresponding SAR image formed from the collected data to be already rotated to an arbitrary angle, without interpolations, resampling, or other similar computationally expensive operations. An image can be rotated to an arbitrary display angle by collecting the raw SAR data set such that its Fourier space samples are located on a grid that is aligned with the ultimate desired rotation angle. In some exemplary embodiments, data can be collected in this manner by suitably adjusting: (1) the radar's angular pulse spacing; and (2) (a) one or more of the radar's waveform parameters (e.g., phase, frequency, chirp rate for a Linear FM chirp waveform), or (2) (b) one or more of the radar's timing parameters (e.g., sampling delay, sample spacing). This eliminates the need for computationally expensive overt data resampling or interpolation, either in the image domain, or in the image's Fourier domain.

Workers in the SAR art will readily recognize that a SAR employing, for purposes of illustration, a Linear-FM chirp waveform, stretch processing, and quadrature demodulation, can have its point target response raw data modeled as $$X_V(t, n) = A(s_x, s_y)\exp\left\{j\frac{4\pi}{c}(f_n + \gamma_n(t - t_{c,n}))(s_x\cos\psi_{c,n}\sin\alpha_n - s_y\cos\psi_{c,n}\cos\alpha_n)\right\}, \quad (1)$$

where
- $c$ = the velocity of propagation,
- $t$ = time,
- $n$ = pulse index number, where $-N/2 \leq n < N/2$,
- $f_n$ = pulse center frequency of nth pulse,
- $\gamma_n$ = pulse chirp rate of nth pulse,
- $t_{c,n}$ = echo delay time to scene center for nth pulse,
- $\psi_{c,n}$ = nominal scene grazing angle for nth pulse,
- $\alpha_n$ = nominal scene aspect angle for nth pulse,
- $s_x$ = x-coordinate for target point,
- $s_y$ = y-coordinate for target point,
- $A(s_x, s_y)$ = amplitude response for target point.

Note that n=0 represents the center pulse of the set that comprises a synthetic aperture. Workers in the art will also recognize that this model makes the common assumption of a flat target scene, and ignores several often-inconsequential error terms. The data collection geometry is illustrated in FIG. 1.

Figure 2:
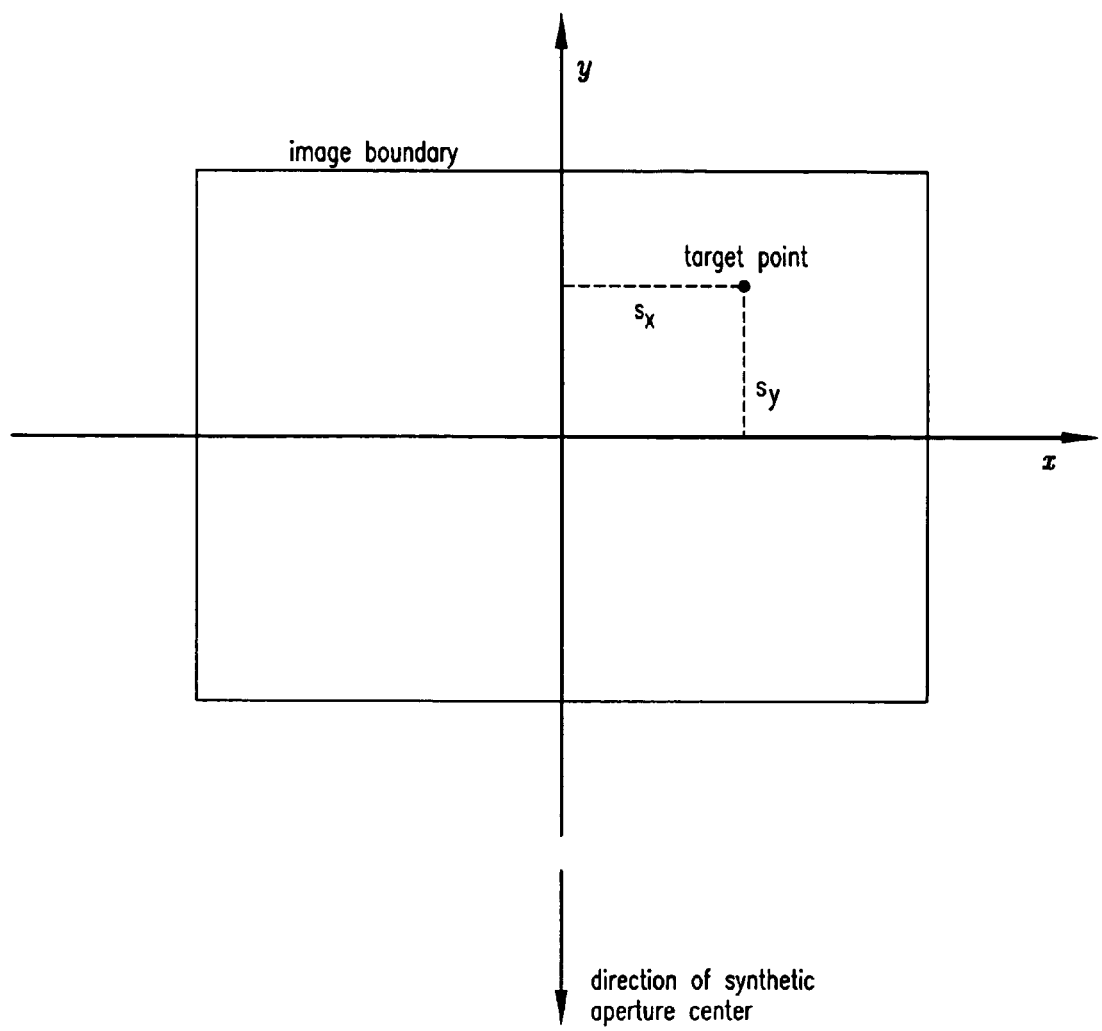
FIG. 2 graphically illustrates a reference image orientation.
Figure 3:
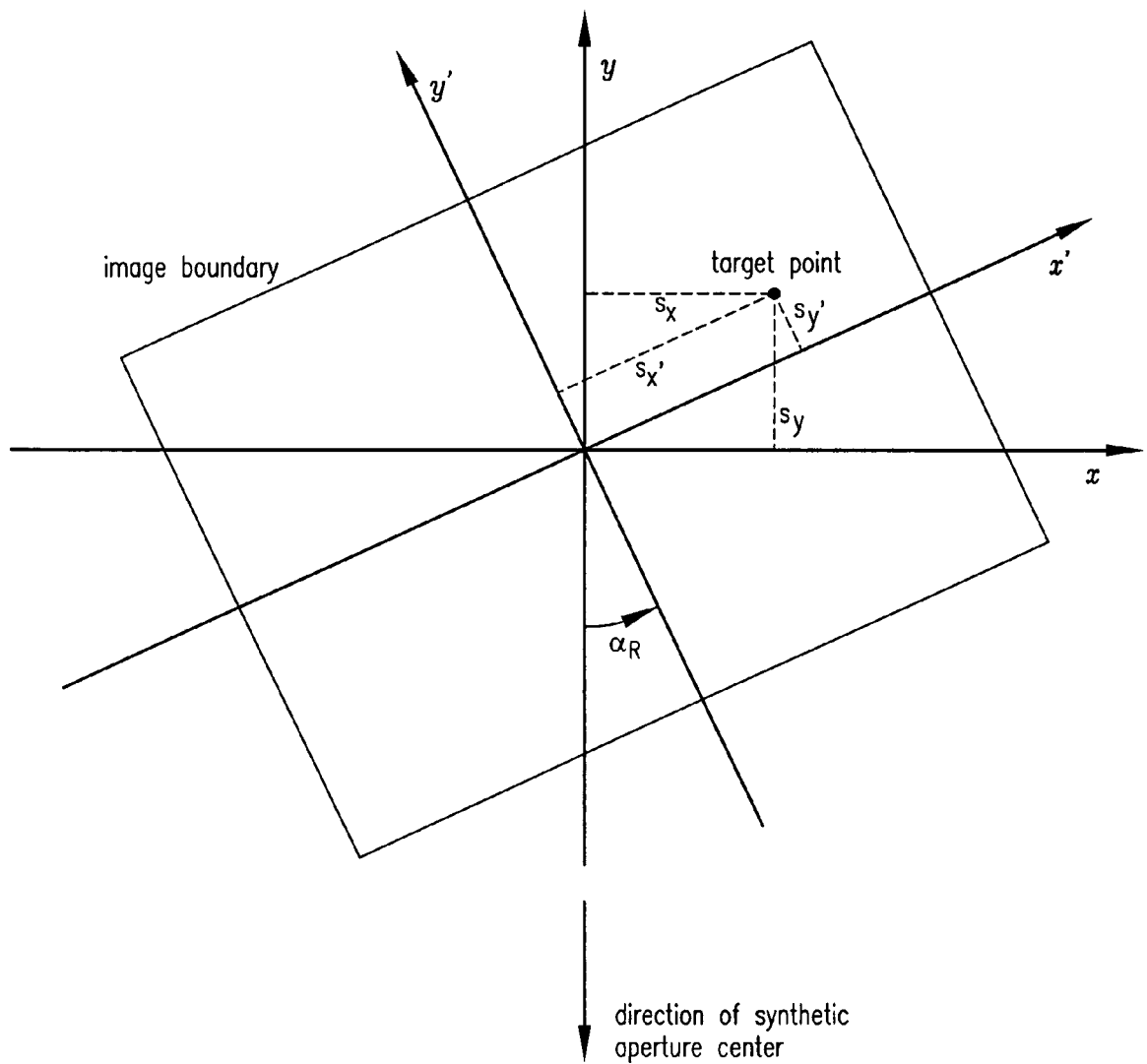
FIG. 3 graphically illustrates a rotated image orientation that is rotated by a rotational amount relative to the reference image orientation of FIG. 2.

Conventional Range-Doppler image formation techniques such as the Polar Format Algorithm (PFA) yield an image corresponding to a target scene, where the image axes correspond to the conventional range and cross-range directions, as illustrated in FIG. 2. The target point coordinates $s_x$ and $s_y$ are identified relative to the x and y-axes. However, many applications may wish to achieve an image of the target scene with axes rotated by an arbitrary angle $\alpha_R$ such as shown in FIG. 3. The rotated image geometry of FIG. 3 includes the axes x' and y', and the target point coordinates are identified as $s_{x'}$ and $s_{y'}$ in FIG. 3. So coordinates $s_x$ and $s_y$ within a first image of the target respectively correspond to coordinates $s_{x'}$ and $s_{y'}$ within a second image of the target that differs from the first image in that it has been rotated by $\alpha_R$ relative to the first image. The rotated coordinates $s_{x'}$ and $s_{y'}$ are related to the corresponding un-rotated (i.e., reference orientation) coordinates $s_x$ (cross-range) and $s_y$ (range) by $$s_{x'} = s_x \cos\alpha_R + s_y \sin\alpha_R \quad (2A)$$

$$s_{y'} = -s_x \sin\alpha_R + s_y \cos\alpha_R \quad (2B)$$

which in turn implies the following inverse relationship:

$$s_x = s_{x'} \cos\alpha_R - s_{y'} \sin\alpha_R \quad (3A)$$

$$s_y = s_{x'} \sin\alpha_R + s_{y'} \cos\alpha_R \quad (3B)$$

The raw data then becomes $$X_V(t, n) = A(s_{x'}, s_{y'})\exp\left\{j\frac{4\pi}{c}(f_n + \gamma_n(t - t_{c,n}))\begin{pmatrix}\cos\psi_{c,n}\sin\alpha_n(s_{x'}\cos\alpha_R - s_{y'}\sin\alpha_R) \\ -\cos\psi_{c,n}\cos\alpha_n(s_{x'}\sin\alpha_R + s_{y'}\cos\alpha_R)\end{pmatrix}\right\} \quad (4)$$

Some simplification provides $$X_V(t, n) = A(s_{x'}, s_{y'})\exp\left\{j\frac{4\pi}{c}(f_n + \gamma_n(t - t_{c,n}))\cos\psi_{c,n}\begin{pmatrix}s_{x'}(\sin\alpha_n\cos\alpha_R - \cos\alpha_n\sin\alpha_R) \\ -s_{y'}(\sin\alpha_n\sin\alpha_R + \cos\alpha_n\cos\alpha_R)\end{pmatrix}\right\} \quad (5)$$

and $$X_V(t, n) = A(s_{x'}, s_{y'})\exp\left\{j\frac{4\pi}{c}(f_n + \gamma_n(t - t_{c,n}))\cos\psi_{c,n}(s_{x'}\sin(\alpha_n - \alpha_R) - s_{y'}\cos(\alpha_n - \alpha_R))\right\} \quad (6)$$

and $$X_V(t, n) = A(s_{x'}, s_{y'})\exp\left\{j\frac{4\pi}{c}(f_n + \gamma_n(t - t_{c,n}))\cos\psi_{c,n}\cos(\alpha_n - \alpha_R)(s_{x'}\tan(\alpha_n - \alpha_R) - s_{y'})\right\}. \quad (7)$$

Note that $X_V$ is a time-domain signal. Sampling this signal with an Analog-to-Digital Converter (ADC) places signal samples at times $$(t - t_{c,n}) = T_{s,n}i + \tau_n \quad (8)$$

where
- $T_{s,n}$ = the ADC sample spacing for the nth pulse,
- $\tau_n$ = the ADC sampling delay or offset for the nth pulse, and
- $i$ = the ADC sampling index, where $-I/2 \leq i < I/2$.

This yields the sampled data set modeled by $$X_V(i, n) = A(s_{x'}, s_{y'})\exp\left\{j\frac{4\pi}{c}(f_n + \gamma_n\tau_n + \gamma_n T_{s,n}i)\cos\psi_{c,n}\cos(\alpha_n - \alpha_R) \times (s_{x'}\tan(\alpha_n - \alpha_R) - s_{y'})\right\}. \quad (9)$$

Exemplary embodiments of the invention can adjust pulse waveform and timing parameters on a pulse-to-pulse basis to achieve optimal frequency content of the data, and can also adjust angular pulse spacing to facilitate optimal azimuth processing. In particular, radar parameters such as center frequency $f_n$, chirp rate $\gamma_n$, ADC delay $\tau_n$, and ADC sample spacing $T_{s,n}$, are adjusted on a pulse-to-pulse basis (i.e., as a function of n) to cause the following relationship $$[(f_n+\gamma_n\tau_n+\gamma_n T_{s,n}i)\cos\psi_{c,n}\cos(\alpha_n-\alpha_R)]=[(f_0+\gamma_0 T_{s,0}i)\cos\psi_{c,0}\cos\alpha_R] \quad (10)$$

where the "0" subscript denotes nominal constant values. This relationship can be achieved in a number of different manners, some examples of which are set forth below. The desired relationship (10) can be achieved, for example, by providing the nth pulse with the following waveform and timing parameters:

$\tau_n=0$, $T_{s,n}=T_{s,0}$, $f_n=\kappa_n f_0$, and $\gamma_n=\kappa_n\gamma_0$ where $$\kappa_n = \left[\frac{\cos\psi_{c,0}\cos\alpha_R}{\cos\psi_{c,n}\cos(\alpha_n-\alpha_R)}\right]. \quad (11)$$

As another example, the desired relationship (10) can be achieved by providing the nth pulse with the following waveform and timing parameters:

$f_n=f_0$, $\gamma_n=\gamma_0$, $T_{s,n}=\kappa_n T_{s,0}$, and $$\tau_n = (\kappa_n - 1)\frac{f_0}{\gamma_0}.$$

These adjustments produce the desired relationship (10) and cause the raw data model to become $$X_V(i,n) = A(s_{x'}, s_{y'})\exp\left\{j\frac{4\pi}{c}(f_0 + \gamma_0 T_{s,0}i)\cos\psi_{c,0}\cos\alpha_R \times (s_{x'}\tan(\alpha_n-\alpha_R) - s_{y'})\right\}. \quad (12)$$

Workers in the art will also recognize that many different algorithms other than the examples set forth above can be developed for adjusting waveform and timing parameters to achieve the desired relationship (10).

Figure 4:
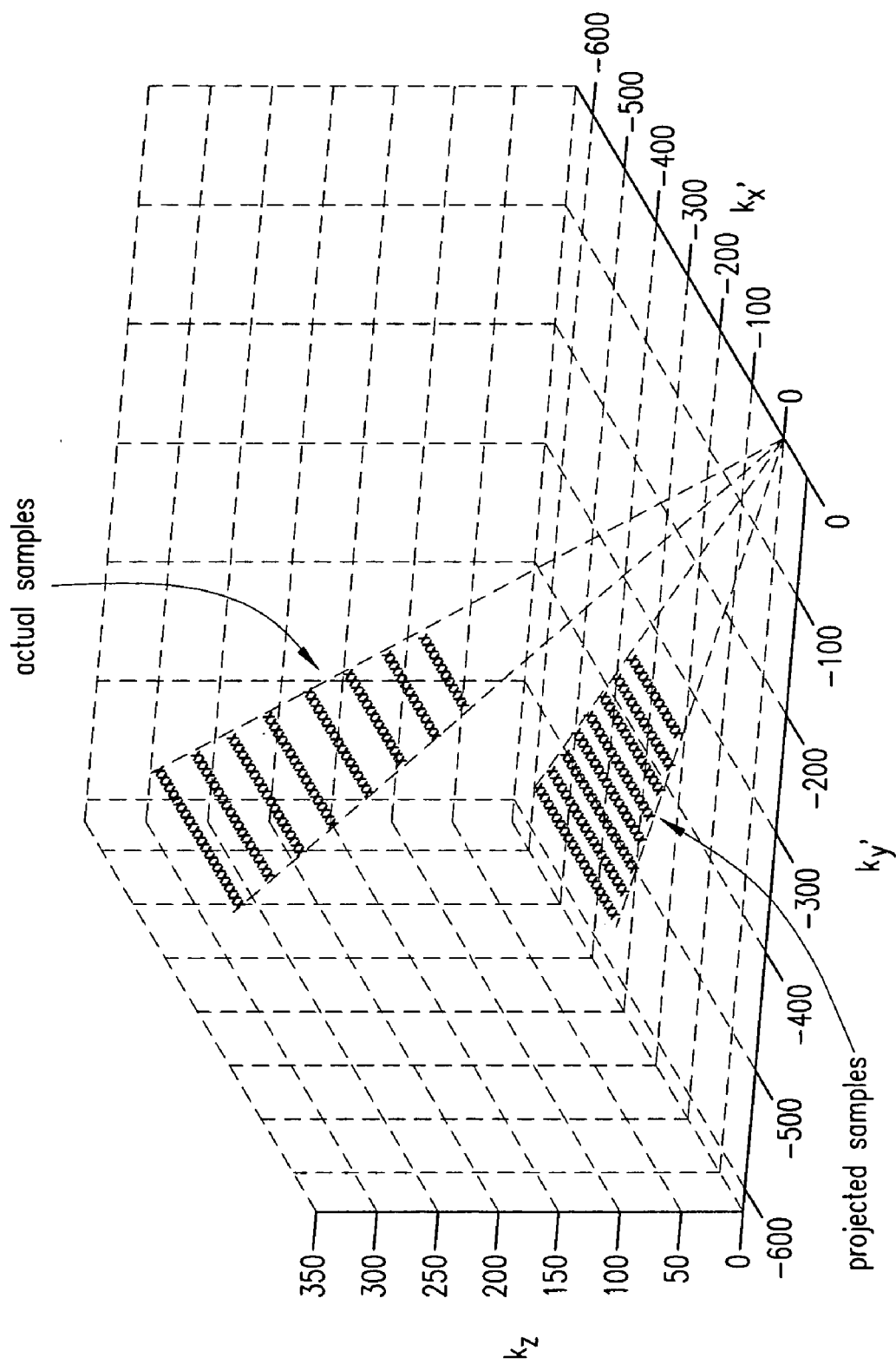
FIG. 4 graphically illustrates in Fourier space an example of how waveform/timing adjustments during SAR data collection can affect the collected SAR data samples according to the invention.

Turning now to some further general definitions, the coordinate frame of the Fourier space of a scene is defined herein by axes $k_{x'}$, $k_{y'}$, $k_{z'}$ that respectively correspond to the x', y', and z axes of the image (see also FIG. 3). Data that is collected to produce the relationship (10) above will manifest the characteristic that samples with constant index i will project in the scene's Fourier space to a constant distance from the $k_{y'}=0$ plane. FIG. 4 illustrates a raw data set's coordinates in the Fourier space, as well as its projection in the $k_z=0$ plane.

Figure 5:
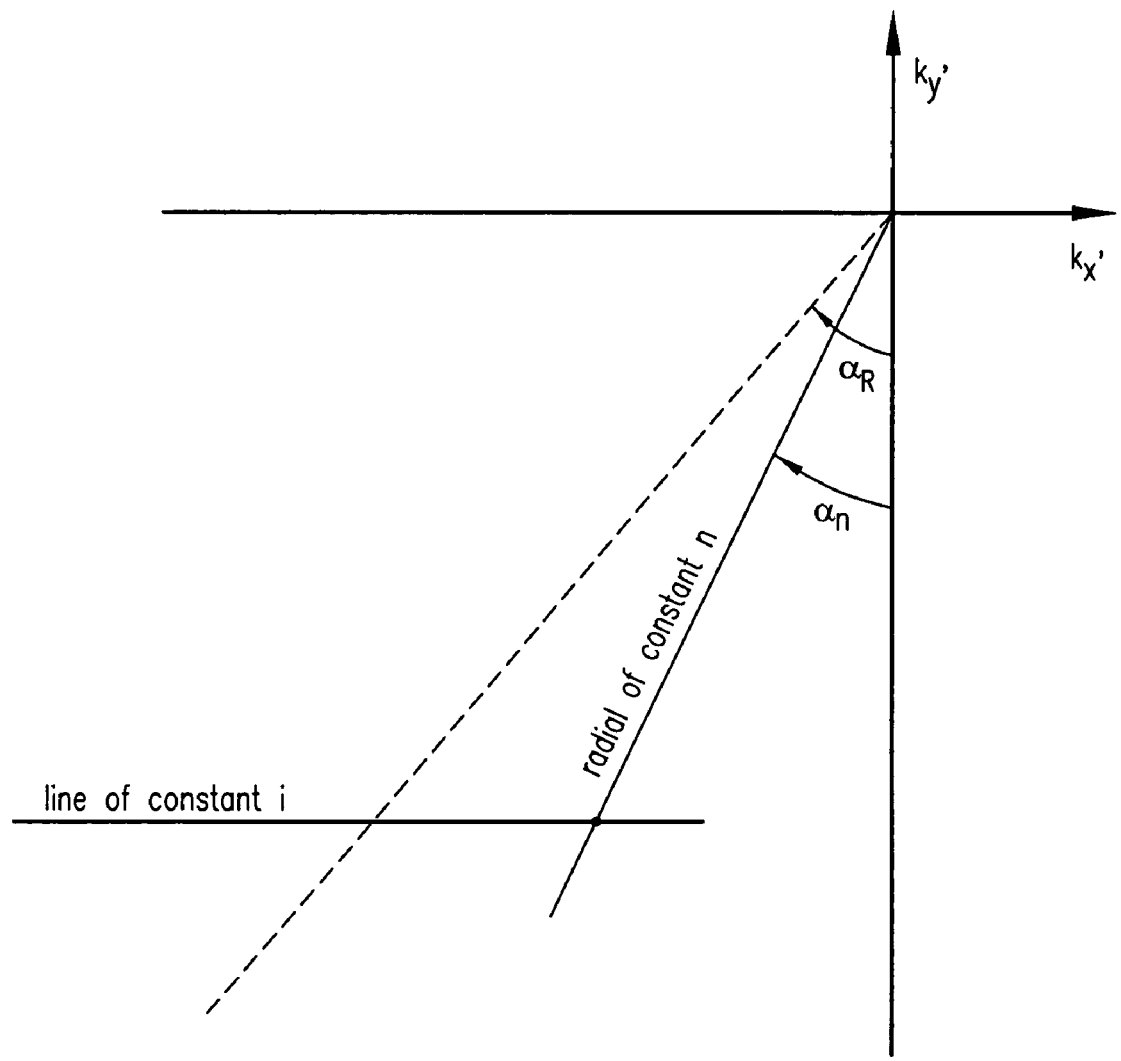
FIG. 5 graphically illustrates selected characteristics of the SAR data samples of FIG. 4.

As is well known in the art, the projection of raw SAR data into a reference plane is implicit in 2-dimensional processing of data collected in a 3-dimensional geometry. FIG. 5 details the location of a projected data sample in the $k_z=0$ plane. A constant sample index i with varying index n will define a line segment parallel to the $k_{x'}$ axis, as shown in FIG. 5. A constant pulse index n with varying index i will define a line segment (radial) oriented in a radial direction from the origin, where any such segment for a particular n is at a constant angle from the origin, and hence not parallel with any other segment corresponding to a different index n.

In order to facilitate efficiently processing the raw data into an image, the raw data should preferably be on a rectangular grid where, in addition to constant sample index i defining a line segment parallel to the $k_{x'}$ axis, constant pulse (i.e., azimuth) index n would define a projected line segment parallel to the $k_{y'}$ axis. As described above, waveform/timing parameter adjustment during SAR data collection can accomplish the desired characteristic for constant sample index i, but not for the azimuth index n. To this end, the data collected using the aforementioned waveform/timing parameter adjustment technique could simply be interpolated to new positions in the $k_{x'}$ direction via a 1-dimensional interpolation operation. This demonstrates that the waveform/timing parameter adjustment technique has, in and of itself, already reduced the interpolation task from a general 2-dimensional interpolation to a more efficient 1-dimensional interpolation.

Exemplary embodiments of the invention can produce the desired results for constant index n by choosing for each pulse an optimal scene aspect angle $\alpha_n$. This can be characterized more generally by choosing the pulse position or angular pulse position. In some embodiments, the radar chooses to emit pulses and collect data at angles $\alpha_n$ that correspond to constant spacing in the $k_{x'}$ direction for any one value of index i, while allowing the constant spacing to be different for different values of index i. This can be achieved by choosing to sample at angular positions where $$\tan(\alpha_n-\alpha_R)=d\alpha n-\tan\alpha_R \quad (13)$$

for constant $d\alpha$.

The parameter $d\alpha$ is related to the nominal increment in the aperture angle between pulses at the center of the synthetic aperture. It is chosen to satisfy the well-known Nyquist criteria for sampled data for digital signal processing systems. It also depends on the scene diameter illuminated by the radar antenna beam. In some embodiments, it may be chosen to satisfy $$d\alpha \le \frac{1}{\theta_{az}f_0 t_{c,0}\cos\psi_{c,0}\cos^2\alpha_R} \quad (14)$$

The amount by which $d\alpha$ is less than the right side of the inequality is determined by the antenna beam characteristics. In some embodiments, $d\alpha$ is about ⅔ of the right side of the inequality. The parameter $t_{c,o}$ in the inequality designates a nominal constant echo delay time that will be described further hereinbelow. The parameter $\theta_{az}$ antenna azimuth beamwidth. The antenna azimuth beamwidth $\theta_{az}$ is a function of the physical structure of the antenna (mainly its azimuth dimension) and its operating frequency. As long as the radar's pulse repetition frequency (PRF) is adequately high, any desired antenna beamwidth can be used. The minimum necessary radar PRF to avoid aliasing can be easily calculated by formulas that are well known in the art. For example, some embodiments use $$PRF > \frac{2v_x}{D_{az}} \quad (15)$$

where $v_x$ is the radar velocity, and $D_{az}$ is the azimuth antenna dimension. In various embodiments, the PRF is 1.5 to 2.0 times the term on the right side of the above inequality.

From relationship (13) above, it can be seen that the desired angular position for the nth pulse will be $$\alpha_n = \arctan(d\alpha n - \tan \alpha_R) + \alpha_R. \quad (16)$$

This selection of $\alpha_n$ permits processing without overt interpolation, or with more efficient interpolation operations. If this desired angular pulse position is used for the nth pulse, then the raw data model becomes $$X_V(i,n) = A(s_{x'}, s_{y'}) \exp\left\{ \begin{array}{l} j\frac{4\pi}{c}(f_0 + \gamma_0 T_{s,0} i)\cos\psi_{c,0}\cos\alpha_R \times \\ (s_{x'} d\alpha n - s_{x'}\tan\alpha_R - s_{y'}) \end{array} \right\}. \quad (17)$$

The phase can be parsed into components to yield $$X_V(i,n) = A(s_{x'}, s_{y'}) \exp\left\{ \begin{array}{l} j\frac{4\pi f_0}{c}\cos\psi_{c,0}\cos\alpha_R s_{x'}\left(1 + \frac{\gamma_0 T_{s,0}}{f_0}i\right)d\alpha n \\ -j\frac{4\pi f_0}{c}\cos\psi_{c,0}\sin\alpha_R s_{x'}\left(1 + \frac{\gamma_0 T_{s,0}}{f_0}i\right) \\ -j\frac{4\pi f_0}{c}\cos\psi_{c,0}\cos\alpha_R s_{y'}\left(\frac{\gamma_0 T_{s,0}}{f_0}i\right) \\ -j\frac{4\pi f_0}{c}\cos\psi_{c,0}\cos\alpha_R s_{y'} \end{array} \right\}. \quad (18)$$

The first phase term is the only one that depends on azimuth index n, and will be exploited to ascertain coordinate $s_{x'}$. The dependence of the first phase term on index i is termed range migration, and is undesirable. For fine resolution images, this would conventionally be mitigated by interpolating to a new index n' such that $$\left(1 + \frac{\gamma_0 T_{s,0}}{f_0}i\right)d\alpha n = d\alpha' n'. \quad (19)$$

This constitutes a linear resampling of the data that varies with index i. Interpolation to achieve this is well known in the art. However, exemplary embodiments of the invention can achieve a linear sample spacing with index n, without the need to resample or interpolate before transform processing. In some embodiments, due to the use of coarser resolution images, range migration effects may be negligible, so the dependence on index i can be ignored.

The second phase term in equation (18) is an error term that accounts for some geometric distortion, but (as demonstrated hereinbelow) can be mitigated once an estimate for $s_{x'}$ is calculated. The third phase term in equation (18) will be exploited to ascertain coordinate $s_{y'}$. The fourth phase term is constant for any one $s_{y'}$, and can be neglected for calculating and displaying magnitude or intensity SAR images in some embodiments. Other embodiments use conventional techniques to mitigate the fourth phase term as may be necessary to support subsequent SAR image exploitation techniques.

Figure 6:
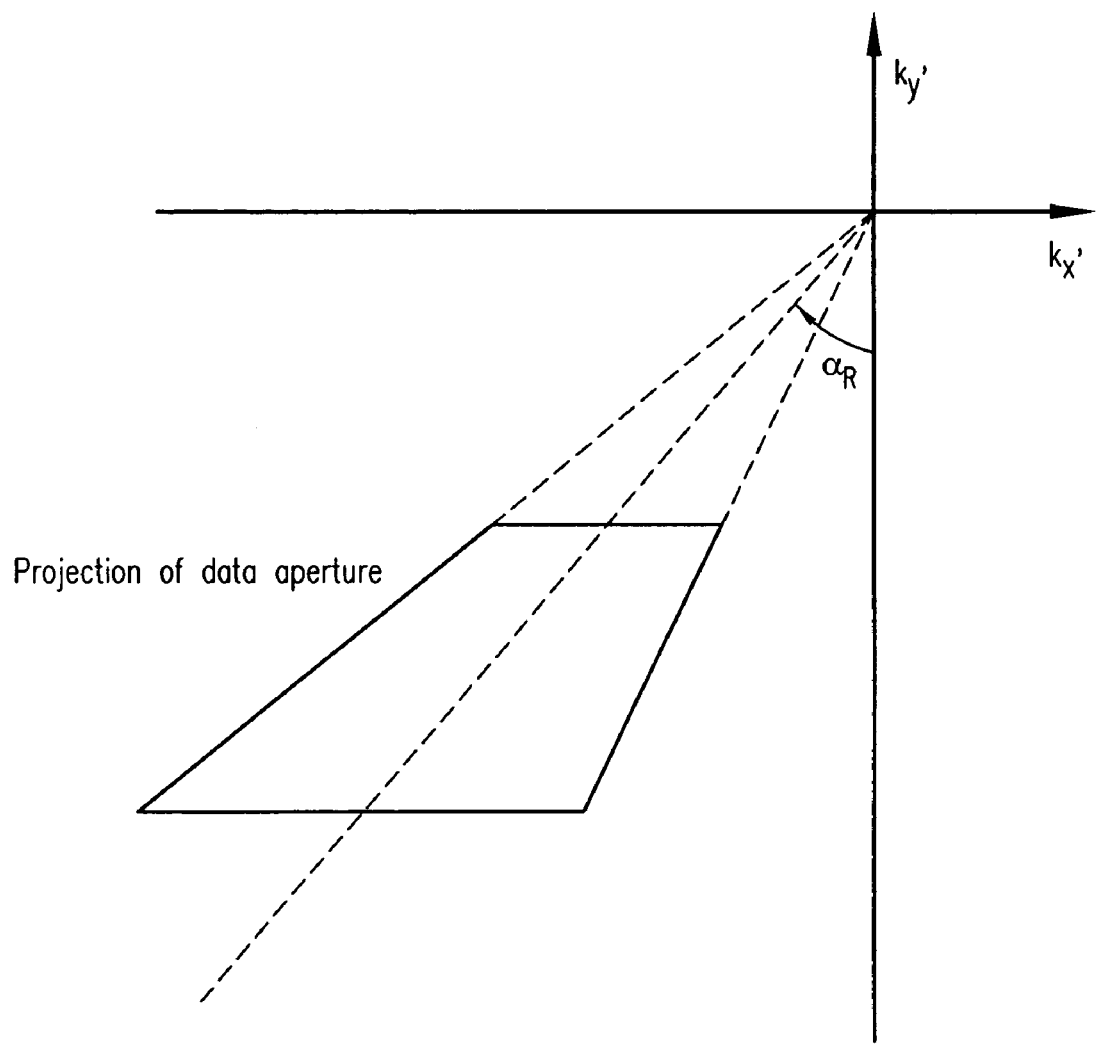
FIG. 6 graphically illustrates in Fourier space an example of how a combination of waveform/timing adjustments and pulse position adjustments during SAR data collection can affect the collected SAR data samples according to the invention.

The above-described positioning of each pulse at the chosen angular position an combined with the aforementioned waveform/timing parameter adjustment, causes the projected data set in Fourier space to assume the shape of a trapezoid, as indicated in FIG. 6. If all of the collected data are used, then this will cause the sidelobe structure in the image to depend on the desired angle of rotation $\alpha_R$. Some embodiments ignore this phenomenon, while other embodiments crop the data to a more palatable shape. The cropping is accompanied by a loss in image resolution.

Considering now image formation, in some embodiments, the Chirped Z-Transform (CZT) is used to accomplish the combined operations of linear resampling followed by a Discrete Fourier Transform (DFT). For clarity of exposition, the following description assumes the use of the CZT to perform a first intermediate processing step in image formation. However, workers in the art will recognize that any of a number of other signal processing techniques can be used to accomplish results equivalent to the combination of linear resampling followed by a DFT. In some embodiments, the CZT is applied to the collected data $X_V(i,n)$ to produce a first intermediate signal as follows $$X_1(i,u) = CZT_n(X_V(i,n)) = \sum_n X_V(i,n)\exp(-j\Delta_f un) \quad (20)$$

where u is the image pixel azimuth index (in the x' direction of FIG. 3). Some exemplary embodiments select the scaling factor $\Delta_f$ to be $$\Delta_F = \frac{2\pi}{n}\left(1 + \frac{\gamma_0 t_{s,0}}{F_0}I\right). \quad (21)$$

This results in $$X_1(i,u) = \quad (22)$$

$$\left[ A(s_{x'}, s_{y'})\exp\left\{ \begin{array}{l} -j\frac{4\pi f_0}{c}\cos\psi_{c,0}\sin\alpha_R s_{x'}\left(1 + \frac{\gamma_0 T_{s,0}}{f_0}i\right) \\ -j\frac{4\pi f_0}{c}\cos\psi_{c,0}\cos\alpha_R s_{y'}\left(\frac{\gamma_0 T_{s,0}}{f_0}i\right) \\ -j\frac{4\pi f_0}{c}\cos\psi_{c,0}\cos\alpha_R s_{y'} \end{array} \right\} \times \right.$$
$$\left. \sum_n \exp\left\{j\left(1 + \frac{\gamma_0 T_{s,0}}{f_0}i\right)\left(\frac{4\pi f_0}{c}\cos\psi_{c,0}\cos\alpha_R d\alpha s_{x'} - \frac{2\pi}{N}u\right)n\right\} \right].$$

Performing the summation yields $$X_1(i,u) = \quad (23)$$

$$\left[ A(s_{x'}, s_{y'})\exp\left\{ \begin{array}{l} -j\frac{4\pi f_0}{c}\cos\psi_{c,0}\sin\alpha_R s_{x'}\left(1 + \frac{\gamma_0 T_{s,0}}{f_0}i\right) \\ -j\frac{4\pi f_0}{c}\cos\psi_{c,0}\cos\alpha_R s_{y'}\left(\frac{\gamma_0 T_{s,0}}{f_0}i\right) \\ -j\frac{4\pi f_0}{c}\cos\psi_{c,0}\cos\alpha_R s_{y'} \end{array} \right\} \times \right.$$
$$\left. W_N\left(\left(1 + \frac{\gamma_0 T_{s,0}}{f_0}i\right)\left(\frac{4\pi f_0}{c}\cos\psi_{c,0}\cos\alpha_R d\alpha s_{x'} - \frac{2\pi}{N}u\right)\right) \right].$$

where the azimuth-dimension impulse response shape is given by $$W_n(\Omega) = \sum_n \exp\{j\Omega n\}. \quad (24)$$

The CZT thus yields an intermediate signal $X_1$ (i,u) that relates the index u to the target coordinate $s_{x'}$ as follows:

$$s_{x'} = \left(\frac{c}{2f_0\cos\psi_{c,0}\cos\alpha_R N d\alpha}\right)u. \quad (25)$$

Note that this relationship is independent of index i, which indicates that range migration has been compensated. The residual dependence of the impulse response on index i is confined to the sidelobe structure, and this effect is ignored in some embodiments. With an estimate of $s_{x'}$, the aforementioned principal geometric distortion term (identified above as the second phase term in equation (18) can be mitigated by calculating for each index pair i and u $$X_2(i, u) = X_1(i, u)\exp\left\{j\frac{4\pi f_0}{c}\cos\psi_{c,0}\sin\alpha_R s_{x'}\left(1 + \frac{\gamma_0 T_{s,0}}{f_0}i\right)\right\} \quad (26)$$

This produces a second intermediate signal (with reduced distortion) as follows $$X_2(i, u) = \begin{bmatrix} A(s_{x'}, s_{y'})\exp\left\{\begin{array}{l}-j\frac{4\pi f_0}{c}\cos\psi_{c,0}\cos\alpha_R s_{y'}\left(\frac{\gamma_0 T_{s,0}}{f_0}i\right) \\ -j\frac{4\pi f_0}{c}\cos\psi_{c,0}\cos\alpha_R s_{y'}\end{array}\right\} \times \\ W_N\left(\frac{4\pi f_0}{c}\cos\psi_{c,0}\cos\alpha_R d\alpha s_{x'} - \frac{2\pi}{N}u\right) \end{bmatrix}. \quad (27)$$

Applying a range DFT across index i relative to the second intermediate signal $X_2$(i,u) yields $$X_3(v, u) = DFT_i(X_2(i, u)) = \sum_i X_2(i, u)\exp\left(-j\frac{2\pi}{I}vi\right) \quad (28)$$

where v is the image pixel range index (in the y' direction of FIG. 3). This range DFT calculates to $$X_3(v, u) = \begin{bmatrix} A(s_{x'}, s_{y'})\exp\left\{-j\frac{4\pi f_0}{c}\cos\psi_{c,0}\cos\alpha_R s_{y'}\right\} \times \\ W_n\left(\frac{4\pi f_0}{c}\cos\psi_{c,0}\cos\alpha_R d\alpha s_{x'} - \frac{2\pi}{N}u\right) \times \\ W_i\left(-\frac{4\pi\gamma_0 T_{s,0}}{c}\cos\psi_{c,0}\cos\alpha_R s_{y'} - \frac{2\pi}{I}v\right) \end{bmatrix}. \quad (29)$$

where the range-dimension impulse response shape is given by $$W_i(\Omega) = \sum_i \exp\{j\Omega i\}. \quad (30)$$

The result $X_3$ (v,u) of the range DFT is a complex image that relates the index v to the target coordinate $s_{y'}$ as follows:

$$s_{y'} = -\left(\frac{c}{2\gamma_0 T_{s,0} I \cos\psi_{c,0}\cos\alpha_R}\right)v. \quad (31)$$

Note that the residual phase term in the complex image $X_3$ (v,u) is inconsequential in a magnitude detected (intensity) image. In view of the foregoing, it can be seen that resolution in the x' and y' directions can be calculated to be, respectively, $$\rho_{x'} = \left(\frac{c}{2f_0 N d\alpha\cos\psi_{c,0}\cos\alpha_R}\right), \text{ and} \quad (32A)$$

$$\rho_{y'} = \left(\frac{c}{2\gamma_0 T_{s,0} I \cos\psi_{c,0}\cos\alpha_R}\right). \quad (32B)$$

These both depend on the rotation parameter $\alpha_R$, coarsening as $\alpha_R$ increases in magnitude. In some embodiments, conventional resolution-determining parameters are compensated for this (e.g. bandwidth increasing, and synthetic aperture lengthening, accordingly).

Although exemplary embodiments of the invention are described above with respect to a single target reflector, workers in the art will recognize that an entire scene can be treated as a superposition of a multitude of reflectors. Conventional SAR processing is linear in nature, as is the above-described SAR processing according to the invention. Such processing may therefore be applied to a data set containing echo information for a scene, resulting in a SAR image that exhibits a desired rotational orientation.

As $\alpha_R$ approaches ±90 degrees, various ones of the above-described SAR data collection adjustments may become unstable. Consequently, in some embodiments, a large rotation angle is accommodated by combining a smaller sub-90 degree rotation with a simple 90 degree rotation. Some embodiments require the sub-90 degree rotation to be less than or equal to ±45 degrees. For example, +100 degrees rotation=+10 degrees rotation followed by +90 degrees rotation. +75 degrees rotation=−15 degrees rotation followed by +90 degrees rotation.

The following is a brief description of various nominal constant value parameters introduced above. Nominal constant value parameters are those for which subscript n=0 represents the chosen expected values for these parameters at the center of a synthetic aperture. Generally, these expected values are chosen to maintain the desired operating characteristics of the radar.

The nominal constant center frequency $f_0$ is defined by a system designer normally as the center of the radar operating frequency band. An example would be 16.7 GHz for the Ku band. It is chosen by the system designer to comply with frequency authorizations and the phenomenology that the particular radar band is able to address.

The nominal constant chirp rate $\gamma_0$ is chosen to achieve a particular bandwidth over the course of the individual radar pulse, where the bandwidth is chosen to achieve a desired range resolution.

The nominal constant ADC sample spacing $T_{s,0}$ is chosen to sample satisfactorily the radar receiver bandwidth, or intermediate frequency (IF) bandwidth in the case of a heterodyne receiver, consistent with the well-known Nyquist criteria for sampled data in digital signal processing systems.

The nominal constant scene grazing angle $\psi_{c,0}$ is selected by the radar typically to be either 1) some desired (e.g., user-specified) grazing angle as part of some desired collection geometry to yield a desired phenomenon in the radar data (e.g. minimum radar altitude above the ground at some stand-off range), or 2) the expected grazing angle to target scene center at the center of the synthetic aperture if current flight path is maintained.

The nominal constant echo delay time depends on the nominal range to the target scene center:

$$t_{c,0} = \frac{2R_{c,0}}{c} \quad (33)$$

where $R_{c,0}$ is selected by the radar typically to be either 1) a desired (e.g., user-specified) range as part of some desired collection geometry to yield a desired phenomenon in the radar data (e.g. minimum stand-off range for safety), or 2) the expected range to target scene center at the center of the synthetic aperture if the current flight path is maintained.

In some exemplary embodiments, the following exemplary values are used as nominal constant parameters:

$f_0$=16.7 GHz for operation at the center of the Ku-band;

$\gamma_0$=6 MHz/microsecond for 1-meter range resolution with a 30-microsecond pulse;

$T_{s,0}$=66 MHz for a radar employing stretch processing with a 30 MHz video bandwidth, and using I/Q demodulation; and $\psi_{c,0}$=30 degrees.

Figure 7:
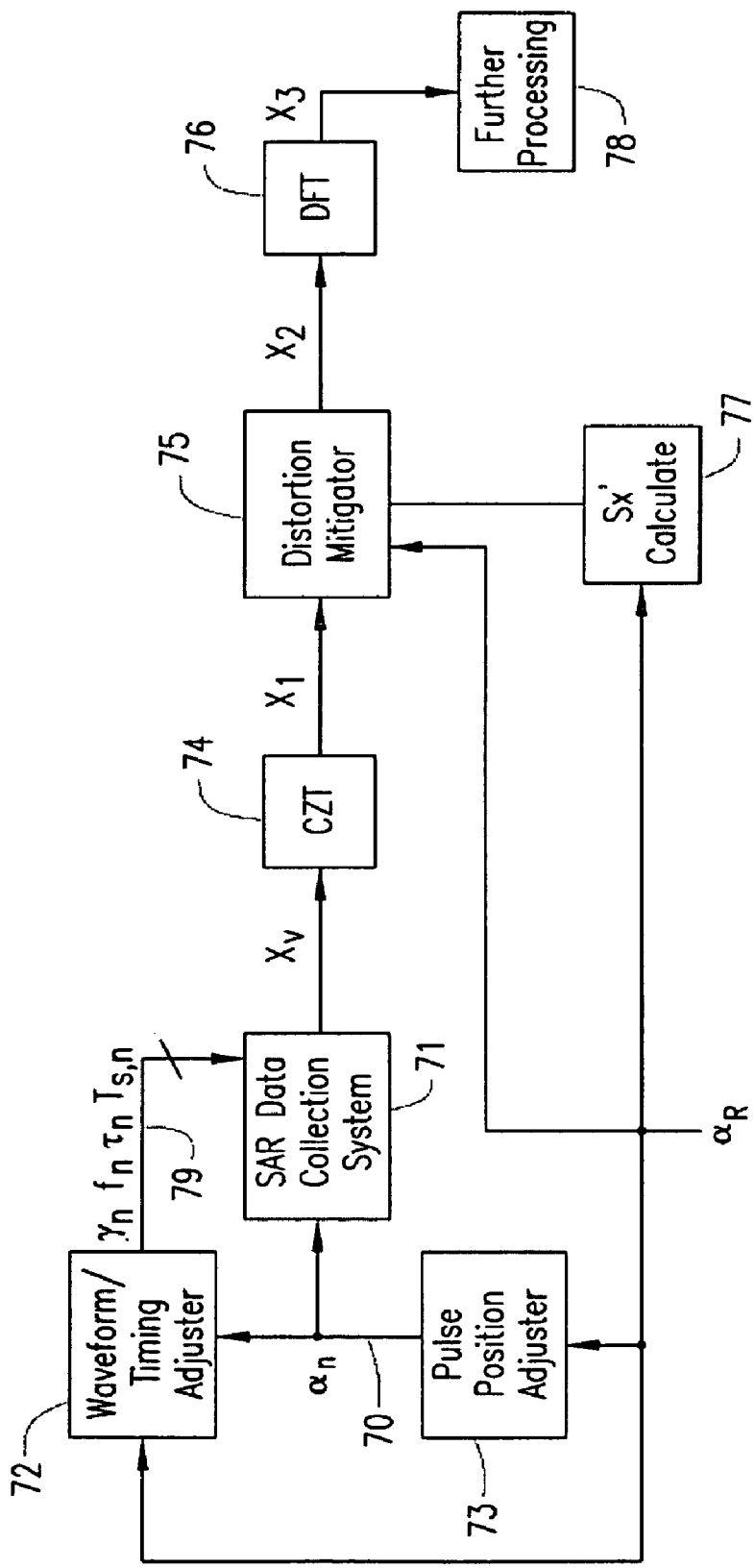
FIG. 7 diagrammatically illustrates a SAR apparatus according to exemplary embodiments of the invention.

FIG. 7 diagrammatically illustrates a SAR apparatus according to exemplary embodiments of the invention. FIG. 7 illustrates an adjustment apparatus that includes a waveform/timing adjuster 72 and a pulse position adjuster 73. Based on the desired rotational angle $\alpha_R$, the pulse position adjuster 73 can make pulse position parameter adjustments on a pulse-to-pulse basis as described above, in order to achieve relationship (16) above. The adjusted pulse position parameter 70 (e.g., adjusted aspect angle $\alpha_n$) is provided to the waveform/timing adjuster 72, and to a SAR data collection system 71.

In some embodiments, the waveform/timing adjuster 72 can make waveform parameter adjustments on a pulse-to-pulse basis as described above, in order to achieve relationship (10) above. The waveform/timing adjuster 72 performs the parameter adjustments based on the desired rotational angle $\alpha_R$, and based on the adjusted pulse position parameter received from the pulse position adjuster 73.

The waveform and timing parameters 79 produced by the waveform/timing adjuster 72 are provided to the SAR data collection system 71. Based on the parameters 79 received from the waveform/timing adjuster 72, and the parameter 70 received from the pulse position adjuster 73, the SAR data collection system 71 can use conventional techniques to collect the SAR data signal $X_v(i,n)$ described by equation (18) above. The collected SAR data signal $X_v(i,n)$ is passed to an image former which is shown generally at 74-77, and which is described hereinbelow.

A CZT processing unit 74 applies CZT processing to $X_v(i,n)$ as described above with respect to equation (20), thereby producing the first intermediate signal $X_1(i,u)$ described above. As mentioned above, the CZT accomplishes a signal processing result that is equivalent to linear resampling followed by a DFT. In various embodiments, other suitable signal processing techniques are applied to $X_v(i,n)$ in order to achieve a signal processing result that is equivalent to linear resampling followed by a DFT.

A distortion mitigator 75 is coupled to the CZT processing unit 74, and implements equation (26) above to reduce distortion in $X_1(i,u)$, thereby producing the second intermediate signal $X_2(i,u)$ described above. The distortion mitigator 75 receives as an input the desired rotational angle $\alpha_R$, for use in implementing equation (26). A calculation unit 77, coupled to the distortion mitigator 75, implements equation (25) above to calculate the rotated coordinates $S_{x'}$. For all values of index u, the distortion mitigator 75 can obtain from calculation unit 77 the respectively corresponding coordinates $s_{x'}$ for use in implementing equation (26).

A DFT processing unit 76 is coupled to the distortion mitigator 75, and applies a range DFT to $X_2(i,u)$ as described above with respect to equation (28), thereby producing the complex image signal $X_3(v,u)$ described above. The signal $X_3(v,u)$ is then available for further processing by a further processing unit 78 that is coupled to the DFT processing unit 76 to receive the signal $X_3(v,u)$. The further processing unit 78 can further process the image signal, which is now rotated as desired, in any desired manner.

It will be evident to workers in the art that the exemplary embodiments described above can be implemented, for example, in hardware, software, and combinations of hardware and software.

Although exemplary embodiments of the invention have been described above in detail, this does not limit the scope of the invention, which can be practiced in a variety of embodiments.

What is claimed is:

1. A synthetic aperture radar (SAR) method, comprising:
providing a SAR data collection operation that normally collects first SAR data from which can be formed a first SAR image that corresponds to a target and is oriented in a predetermined reference orientation;
adjusting the SAR data collection operation based on a predetermined amount of rotation by which a second SAR image corresponding to the target is to be rotated relative to said predetermined reference orientation; and
collecting second SAR data according to the adjusted SAR data collection operation.

2. The method of claim 1, including forming the second SAR image based on the second SAR data, the second SAR image rotated by said predetermined amount relative to said predetermined reference orientation.

3. The method of claim 2, including reducing distortion in the second SAR data based on said predetermined amount of rotation.

4. The method of claim 1, wherein said adjusting includes adjusting one of a waveform parameter, a timing parameter, and an angular position parameter associated with a radar pulse.

5. The method of claim 4, wherein said waveform parameter includes one of center frequency and chirp rate.

6. The method of claim 5, wherein said timing parameter includes one of digital sampling delay and digital sample spacing.

7. The method of claim 6, wherein said angular position parameter includes aspect angle.

8. The method of claim 4, wherein said timing parameter includes one of digital sampling delay and digital sample spacing.

9. The method of claim 8, wherein said angular position parameter includes aspect angle.

10. The method of claim 4, wherein said angular position parameter includes aspect angle.

11. The method of claim 10, wherein said waveform parameter includes one of center frequency and chirp rate.

12. The method of claim 4, including adjusting said angular position parameter, and adjusting said waveform parameter based on the adjusted angular position parameter.

13. The method of claim 12, including adjusting said angular position parameter, and adjusting said timing parameter based on the adjusted angular position parameter.

14. A SAR method, comprising:
receiving first SAR data that has been collected using a SAR data collection operation that has been adjusted to collect the first SAR data based on a predetermined amount of rotation by which a first SAR image corresponding to a target is to be rotated relative to a predetermined reference orientation, the SAR data collection operation normally collecting second SAR data from which can be formed a second SAR image that corresponds to the target and is oriented in said predetermined reference orientation; and
forming the first SAR image based on the first SAR data, wherein the first SAR image is rotated by said predetermined amount relative to said predetermined reference orientation.

15. A SAR apparatus, comprising:
a SAR data collector for performing a SAR data collection operation that normally collects first SAR data from which can be formed a first SAR image that corresponds to a target and is oriented in a predetermined reference orientation;

an adjuster coupled to said SAR data collector for adjusting the SAR data collection operation based on a predetermined amount of rotation by which a second SAR image corresponding to the target is to be rotated relative to said predetermined reference orientation; and
said SAR data collector responsive to said adjuster for collecting second SAR data according to the adjusted SAR data collection operation.

16. The apparatus of claim 15, including an image former coupled to said SAR data collector for forming the second SAR image based on the second SAR data, the second SAR image rotated by said predetermined amount relative to said predetermined reference orientation.

17. The apparatus of claim 16, wherein said image former includes a distortion mitigator coupled to said SAR data collector for reducing distortion in the second SAR data based on said predetermined amount of rotation.

18. The apparatus of claim 17, wherein said image former includes a Chirped Z-Transform (CZT) processing unit coupled to said SAR data collector and said distortion mitigator, and a Discrete Fourier Transform (DFT) processing unit coupled to said distortion mitigator.

19. A SAR apparatus, comprising:
an input for receiving first SAR data that has been collected using a SAR data collection operation that has been adjusted to collect the first SAR data based on a predetermined amount of rotation by which a first SAR image corresponding to a target is to be rotated relative to a predetermined reference orientation, the SAR data collection operation normally collecting second SAR data from which can be formed a second SAR image of the target that is oriented in said predetermined reference orientation; and
an image former coupled to said input for forming the first SAR image based on the first SAR data, wherein the first SAR image is rotated by said predetermined amount relative to said predetermined reference orientation.

* * * * *